(12) United States Patent
Sydir et al.

(10) Patent No.: US 9,473,878 B2
(45) Date of Patent: Oct. 18, 2016

(54) APPARATUS, METHOD AND SYSTEM OF MANAGING A WEARABLE DEVICE ENSEMBLE

(71) Applicant: INTEL CORPORATION, Santa Clara, CA (US)

(72) Inventors: Jaroslaw J. Sydir, San Jose, CA (US); Thomas W. Stroebel, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/583,158

(22) Filed: Dec. 25, 2014

(65) Prior Publication Data

US 2016/0192112 A1 Jun. 30, 2016

(51) Int. Cl.
| | | |
|---|---|---|
| *G08B 21/00* | (2006.01) | |
| *H04W 4/00* | (2009.01) | |
| *H04B 13/00* | (2006.01) | |
| *G08B 21/24* | (2006.01) | |

(52) U.S. Cl.
CPC .............. *H04W 4/006* (2013.01); *G08B 21/24* (2013.01); *H04B 13/005* (2013.01)

(58) Field of Classification Search
CPC .......... G06F 19/3418; G06F 19/3412; H04W 4/008
USPC ....................................................... 375/686.6
See application file for complete search history.

(56) References Cited

U.S. PATENT DOCUMENTS

| | | | | |
|---|---|---|---|---|
| 7,978,063 B2* | 7/2011 | Baldus | ................. | A61B 5/0006 340/539.12 |
| 2008/0129465 A1* | 6/2008 | Rao | ...................... | A61B 5/0031 340/286.02 |
| 2008/0298389 A1* | 12/2008 | Nagaike | .............. | H04B 13/005 370/468 |
| 2009/0322513 A1* | 12/2009 | Hwang | .............. | A61B 5/02055 340/539.12 |
| 2015/0057576 A1* | 2/2015 | Chen | .................... | A61B 5/0024 600/595 |

OTHER PUBLICATIONS

IEEE Std 802.15.6™-2012; IEEE Standard for Local and metropolitan area networks—Part 15.6: Wireless Body Area Networks, Feb. 29, 2012, 271 pages.

\* cited by examiner

*Primary Examiner* — Don N Vo
(74) *Attorney, Agent, or Firm* — Shichrur & Co.

(57) ABSTRACT

Some demonstrative embodiments include apparatuses, devices, systems and methods of managing a wearable device ensemble. For example, a wearable device may include a memory to store a plurality of device identifiers of a plurality of wearable devices belonging to a wearable device ensemble; a human body communication (HBC) transceiver to communicate over an HBC network via a body of a user, the HBC transceiver to receive via the HBC network one or more detected identifiers of one or more detected wearable devices on the body; and an ensemble manager to manage the wearable device ensemble, and to generate an alert based on a comparison between the one or more detected identifiers and the plurality of device identifiers.

25 Claims, 7 Drawing Sheets

APPARATUS, METHOD AND SYSTEM OF MANAGING A WEARABLE DEVICE ENSEMBLE

TECHNICAL FIELD

Embodiments described herein generally relate to an apparatus, system and method of managing a wearable device ensemble.

BACKGROUND

A Human Body Communication (HBC) technology, also referred to as Intra-body communication and Body Coupled communication, may be used for Body Area Networks (BANs).

The HBC technology may enable an HBC communication of a communication signal to be coupled directly onto a human body via a transmitter on the human body, and to be received by a receiver on the human body.

The transmitter and/or the receiver may be in touch with the skin of the human body, or may be in a close proximity to the skin to perform the HBC communication.

The HBC communication may enable communication without interference on the human body. For example, a first transmission on a body of a first user may not interfere with a second transmission on a body of a second user, e.g., even if the first and second users are within the same room.

A wearable device may be configured to support the HBC communication via the human body. The HBC communication between wearable devices may be possible only if the wearable devices are on the body of the user, for example, directly touching the skin of the user, or in a close proximity to the body, e.g., in a pocket of the user.

The wearable devices may include, for example, bands, glasses, clothing, shoes, watches, and the like, which are directly touching the skin; and/or Smartphones, GPS devices, tags, PDA devices, and the like, which are carried by the user, e.g., in the pocket of cloths worn by the user.

The HBC technology may use various coupling methods to couple the communication signal onto the human body. A first coupling method may include a Galvanic coupling, which requires that two electrodes at the receiver, and two electrodes at the transmitter are in touch with the skin of the body. A second coupling method may include a capacitive coupling, in which electrodes of the receiver and electrodes of the transmitter may be in close proximity to the skin.

As the HBC technology becomes popular and widespread, users may wear multiple wearable devices on various parts of their bodies. For example, a user may wear and/or carry a Smartphone, a watch, a heart rate monitor, smart clothes, and/or smart glasses, for example, at the same time.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
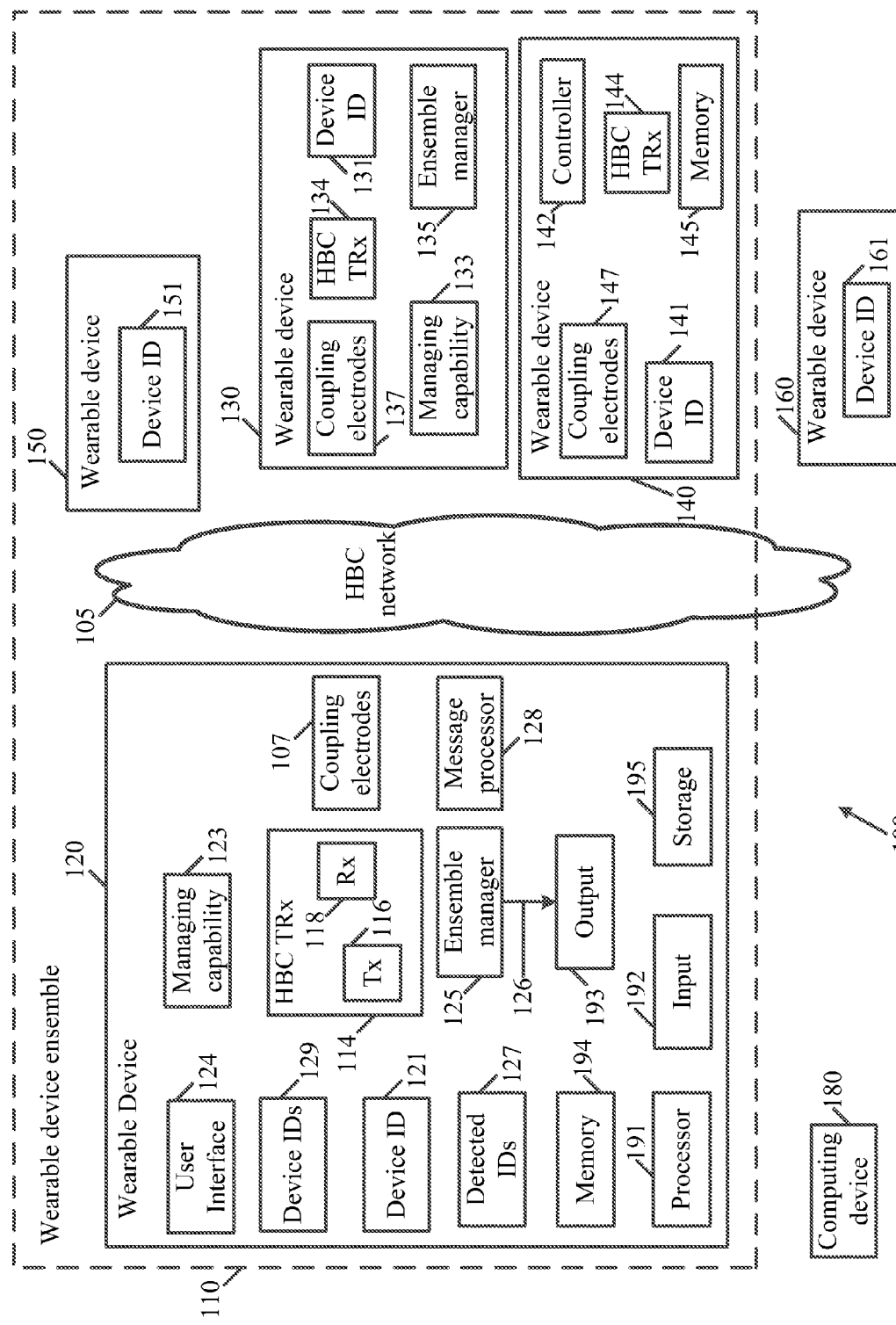
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Bluetooth device, an Internet of Things (IoT) device, a handheld computer, a handheld device, a Personal Digital Assistant (PDA) device, a handheld PDA device, a mobile or portable device, a consumer device, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.15.6 standards (*IEEE 802.15.6-2012, IEEE Standard for Local and metropolitan area networks—Part 15.6: Wireless Body Area Networks*), devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad (*"IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band"*, 28 Dec. 2012); IEEE 802.11Revmc; IEEE 802.11x) and/or future versions and/or derivatives thereof, devices and/or networks operating in accordance with existing WirelessHD™ specifications, and/or future versions and/or derivatives thereof, devices and/or networks operating in accordance with existing and/or Wireless Fidelity (WiFi) Alliance (WFA) Peer-to-Peer (P2P) specifications (*WiFi P2P technical specification, version 1.2, 2012*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Reference is now made to FIG. 1, which schematically illustrates a block diagram of a system 100, in accordance with some demonstrative embodiments.

As shown in FIG. 1, in some demonstrative embodiments, system 100 may include one or more wearable devices capable of communicating content, data, information and/or signals over a Human Body Communication (HBC) network 105 via a body of a user.

In some demonstrative embodiments, system 100 may include a wearable device 120, a wearable device 130, a wearable device 140, a wearable device 150, and/or a wearable device 160.

In some demonstrative embodiments, wearable devices 120, 130, 140, 150, and/or 160 may communicate over the HBC network 105 using an HBC technology and/or an HBC communication, e.g., as described below.

In some demonstrative embodiments, wearable devices 120, 130, 140, 150, and/or 160 may be configured to communicate on one or more other networks, for example, in addition to HBC network 105, e.g., a Bluetooth network, a WLAN network, a cellular network, a WiFi network, and/or the like.

In some demonstrative embodiments, wearable devices 120, 130, 140, 150, and/or 160 may include, for example, wearable devices, which are in direct contact with the skin of the user, e.g., a watch, bands, wrists, clothes, socks, jewelries, a ring, a necklace, and the like; and/or wearable devices, which are placed in close proximity to the skin of the user, for example, in a pocket of clothing worn by the user, e.g., a Smartphone, a PDA, and the like.

In some demonstrative embodiments, system 100 may include one or more computing devices and/or wireless communication devices.

For example, device 120 may include, a tablet computer, a handheld computer, a PDA device, a handheld PDA device, an on-board device, a user equipment (UE), an IoT device, an off-board device, a hybrid device (e.g., combining cellular phone functionalities with PDA device functionalities), a consumer device, a mobile or portable device, a mobile phone, a cellular telephone, a, a mobile or portable GPS device, an Ultra Mobile Device (UMD), a Smartphone, a music player, or the like.

In some demonstrative embodiments, device 120 may also include, for example, a processor 191, an input unit 192, an output unit 193, a memory unit 194, and/or a storage unit 195. Device 120 may optionally include other suitable hardware components and/or software components. In some demonstrative embodiments, some or all of the components of device 120 may be enclosed in a common housing or packaging, and may be interconnected or operably associated using one or more wired or wireless links. In other embodiments, components of device 120 may be distributed among multiple or separate devices.

Processor 191 may include, for example, a Central Processing Unit (CPU), a Digital Signal Processor (DSP), a Graphics Processing Unit (GPU), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of device 120 and/or of one or more suitable applications.

Memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by device 120.

Input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, Cathode Ray Tube (CRT) display unit, one or more audio speakers or earphones, or other suitable output devices.

In some demonstrative embodiments, wearable devices 120, 130, 140, 150, and/or 160 may include one or more HBC transceivers (TRx) including circuitry and/or logic to perform HBC communication between devices 120, 130, 140, 150, 160 and/or one or more other wearable device devices. For example, device 120 may include an HBC transceiver 114, device 130 may include an HBC transceiver 134, and/or device 140 may include an HBC transceiver 144.

In some demonstrative embodiments, HBC transceivers 114, 134, and/or 144 may include one or more HBC receivers (Rx) including circuitry and/or logic to receive HBC communication signals, frames, blocks, transmission streams, packets, messages, data items, and/or data. For example, HBC transceiver 114 may include an HBC receiver 116.

In some demonstrative embodiments, HBC transceivers 114, 134, and/or 144 may include one or more HBC transmitters (Tx) including circuitry and/or logic to send HBC communication signals, frames, blocks, transmission streams, packets, messages, data items, and/or data. For example, HBC transceiver 114 may include an HBC transmitter 118.

In some demonstrative embodiments, HBC transceivers 114, 134, and/or 144 may include circuitry, logic, modulation elements, demodulation elements, amplifiers, analog to digital and digital to analog converters, filters, and/or the like.

In some demonstrative embodiments, HBC transceiver 114 may include, or may be associated with, one or more coupling electrodes 107; HBC transceiver 134 may include, or may be associated with, one or more coupling electrodes 137; and/or HBC transceiver 144 may include, or may be associated with, one or more coupling electrodes 147.

In some demonstrative embodiments, coupling electrodes 107, 137 and/or 147 may include any type of electrodes suitable for transmitting and/or receiving blocks, frames, transmission streams, packets, messages and/or data via HBC network 105.

In some demonstrative embodiments, coupling electrodes 107, 137 and/or 147 may include galvanic coupling electrodes.

In some demonstrative embodiments, the galvanic coupling electrodes may include two electrodes configured to communicate via HBC network 105, for example, by touching the skin of the user.

In some demonstrative embodiments, coupling electrodes 107, 137 and/or 147 may include capacitive coupling electrodes.

In some demonstrative embodiments, the capacitive coupling electrodes may be configured to communicate via HBC network 105, for example, when the capacitive coupling electrodes are in proximity to the body of the user, e.g., even when not directly touching the skin of the user.

In some demonstrative embodiments, one or more wearable devices of system 100 may belong to a wearable device ensemble 110.

In one example, wearable devices 120, 130, 140 and 150 may belong to wearable device ensemble 110, and/or wearable device 160 may not belong to wearable device ensemble 110.

In another example, any other wearable devices of system 100 may belong to wearable device ensemble 110, and or any other wearable devices of system 100 may not belong to wearable device ensemble 110.

In some demonstrative embodiments, a wearable device ensemble may include a group of wearable devices configured to satisfy a common purpose and/or a need of the user.

In one example, wearable device ensemble 110 may include a fitness ensemble configured to be used by the user for exercising. According to this example, wearable ensemble 110 may include a heart rate monitor, sunglasses, sneakers, running pants, a GPS, and the like.

In another example, wearable device ensemble 110 may include a work ensemble configured to be used by the user for work. According to this example, wearable ensemble 110 may include a tie, a Smartphone, a belt, a pen, reading glasses, and the like.

In some demonstrative embodiments, one or more devices of wearable device ensemble may be configured to manage wearable device ensemble 110.

In some demonstrative embodiments, device 120 may be configured to manage wearable device ensemble 110.

In some demonstrative embodiments, device 120 may include an ensemble manager 125 configured to manage wearable device ensemble 110, e.g., as described below.

In some demonstrative embodiments, another wearable device of wearable device ensemble 110 may be configured to manage wearable device ensemble 110.

In some demonstrative embodiments, device 130 may include an ensemble manager 135 configured to manage wearable device ensemble 110, for example, instead of ensemble manager 125, e.g., as described below.

In some demonstrative embodiments, ensemble managers 125 and/or 135 may include circuitry and or logic, e.g., one or more processors including circuitry, memory circuitry, and/or any other circuitry and/or logic, configured to perform the functionality of ensemble managers 125 and/or 135. Additionally or alternatively, one or more functionalities of ensemble managers 125 and/or 135 may be implemented by logic, which may be executed by a machine and/or one or more processors, e.g., as described below.

In some demonstrative embodiments, one or more devices of wearable device ensemble 110 may not be configured to manage wearable device ensemble 110. For example, wearable devices 140 and/or 150 may not be configured to manage wearable device ensemble 110.

In some demonstrative embodiments, wearable devices 140 and/or 150 may include a controller configured to control one or more functionalities of wearable devices 140 and/or 150. For example, wearable device 140 may include a controller 142 to control one or more functionalities of wearable device 140, e.g., as described below.

In some demonstrative embodiments, controller 142 may include circuitry and or logic, e.g., one or more processors including circuitry, memory circuitry, and/or any other circuitry and/or logic, configured to perform the functionality of controller 142. Additionally or alternatively, one or more functionalities of controller 142 may be implemented by logic, which may be executed by a machine and/or one or more processors, e.g., as described below.

In some demonstrative embodiments, at least part of the functionality controller 142 may be implemented as part of HBC transceiver 144. In other embodiments, the functionality of controller 144 may be implemented as part of any other element of wearable device 140.

In some demonstrative embodiments, device 120 may include a message processor 128 configured to generate, process and/or access one or messages communicated by device 120.

In one example, message processor 128 may be configured to generate one or more messages to be transmitted by device 120 via HBC network 105, and/or message processor 128 may be configured to access and/or to process one or more messages received by device 120 via HBC network 105, e.g., as described below.

In some demonstrative embodiments, message processor 128 may include circuitry and or logic, e.g., one or more processors including circuitry, memory circuitry, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of HBC transceiver 114. In other embodiments, at least part of the functionality of message processor 128 may be implemented as part of ensemble manager 125.

In other embodiments, the functionality of message processor 128 may be implemented as part of any other element of device 120.

In one example, message processor 128 may be configured to generate, process and/or access one or messages to manage ensemble 110.

In some demonstrative embodiments, ensemble manager 125 may be implemented in a single device ("centralized ensemble manager") of wearable device ensemble 110, e.g., device 120, In some demonstrative embodiments, ensemble manager 125 may be implemented by two or more wearable devices ("distributed ensemble manager") of wearable device ensemble 110, e.g., as described below.

In some demonstrative embodiments, ensemble manager 125 may be implemented by a computing device 180, e.g., a laptop, a desktop, a Smartphone and the like, which does not belong to wearable device ensemble 110.

In some demonstrative embodiments, one or more functionalities of ensemble manager 125 may be distributed between wearable device 120 and another device, for example, computing device 180. For example, wearable device 120 may include message processor 128 and HBC transceiver 114 to process and/or communicate messages over HBC network 105, e.g., the messages to manage wearable device ensemble 110; and/or computing device 180 may include a processor, a software, and/or an algorithm to manage wearable device ensemble 110, e.g., via wearable device 120.

In some demonstrative embodiments, ensemble manager 125 may enable a user of wearable device ensemble 110 to track, monitor, detect, and/or to manage the wearable devices of wearable device ensemble 110.

In some demonstrative embodiments, ensemble manager 125 may enable a user of wearable device ensemble 110 to monitor a presence and/or an absence of one or more wearable devices of wearable device ensemble 110 on the body of the user.

In one example, the fitness ensemble may include five wearable devices. According to this example, ensemble manager 125 may assure that all the five wearable devices are on the body of the user, and may alert the user, for example, if a wearable device is missing, falls off the body, is not worn on the body, and the like.

In another example, the user may have two or more wearable device ensembles, for example, a fitness ensemble and a work ensemble. According to this example, when the user switches from the work ensemble to the fitness ensemble, for example, when the user comes back from work and goes to exercise, the ensemble manager may assure that all wearable devices of the work ensemble, e.g., the reading glasses, the Smartphone, the tie, and the like, are taken off the body of the user, and that all wearable devices of the fitness ensemble, e.g., the heart rate monitor, the sunglasses, and the like, may be present on the body of the user.

In some demonstrative embodiments, using the HBC technology and the HBC communication via HBC network 105 may be advantageous over other communication technologies to manage wearable device ensemble 110.

In one example, the HBC technology may be power efficient, e.g., compared to RF-based technologies. The power efficiency may enable an increased sampling rate or a continuous tracking of wearable device ensemble 110, for example, to monitor the presence or absence of one or more wearable devices of wearable device ensemble 110 on the body of the user.

In another example, a range of the HBC communication is limited to wearable devices that are in contact with the body, or in a close proximity to the body. According to this example, a wearable device of a wearable device ensemble that falls off the body of the user, or is placed on a table, may not be able to communicate with the other wearable devices of the ensemble that are on the body of the user via the HBC network. Therefore, using the HBC communication to detect presence of a wearable device on the body of the user may be reliable and robust.

In some demonstrative embodiments, using other technologies, e.g., different from the HBC technology, and/or sensors to manage ensemble 110 may be inefficient. For example, a Near Field Communication (NFC) technology, a wireless communications technology, e.g., Bluetooth or Zigbee technologies, thermal sensors, movement sensors, and/or having the user keep track of things ("the old fashioned way") may be inefficient.

In one example, the Near Field Communication (NFC) technology may be able to manage the ensemble, for example, since a range of NFC communications is limited to a short range. However, the user may have to scan and/or to pair every wearable device of the ensemble, for example, when the placing the wearable device on the body.

An NFC ensemble manager may be able to alert, for example, if a wearable device of the ensemble is missing, e.g., based on the scan. However, the NFC technology may not be able to detect if a wearable device of the ensemble falls off the body of the user.

Additionally, scanning each wearable device of the wearable device ensemble may be inconvenient and/or may require the user to perform multiple operations, thereby degrading user experience.

Furthermore, a distraction of the user during the scanning of the wearable device may cause the user to put the wearable device aside, for example, on a counter, and to forget to put the wearable device on the body after the scanning.

In another example, the short-range wireless technology, such as Bluetooth (BT) or Bluetooth Low Energy (BLE), may also be able to manage the ensemble. However, the short-range wireless technology may pose additional requirements on the user. For example, the short-range wireless technology may not be able to determine which wearable devices of the ensemble are actually on the body.

The short-range wireless technology may not be able to distinguish between a device being on the body or within a few meters from the body, e.g., on the counter, or if the device falls on the floor. For example, if the user stands near a closet full of shirts having BT identification (ID) tags and wearing a shirt having a BT ID tag, a BT ensemble manager may not be able to determine which of the shirts the user is actually wearing. To attend this problem, the user may have to perform one or more additional operations, for example, pressing a button on the BT ID tag of the shirt, when the user puts the shirt on, e.g., to notify the BT ensemble manager.

Additionally, the BT manager may not be able to immediately detect that a wearable device is missing, for example, if the wearable device falls off the body, e.g., since a range of BT communication is a few meters. Accordingly, a warning that the wearable device falls off the body may not be issued until the user has moved a few meters away from the fallen wearable device.

In another example, combinations of sensors and RF-based technologies may also be able to manage the ensemble.

In one example, an accelerometer and/or a thermal sensor may provide an indication whether a wearable device is on the body of the user, for example, based on a body temperature of the body of the user and/or an acceleration of a fallen wearable device.

In another example, location based technologies may provide an indication as to whether or not a device is moving with the user, for example, based on a location of the device and a location of the user.

However, a system implementing such combinations may be complicated, inaccurate, and/or may have increased power consumption, for example, compared to the HBC technology.

In some demonstrative embodiments, ensemble manager 125 may manage ensemble 110 based on the HBC communication via HBC network 105 between wearable devices of wearable device ensemble 110, e.g., as described below.

In some demonstrative embodiments, ensemble manager 125 may manage ensemble 110 using the HBC network 105, for example, in addition to or in conjunction with one or more of the technologies described above.

For example, ensemble manager 125 may monitor the presence or the absence of one or more wearable devices of wearable device ensemble 110 based on the HBC communication between devices 120, 130, 140, 150 and/or 160, e.g., via HBC network 105.

In some demonstrative embodiments, ensemble manager 125 may communicate with the wearable devices of manage ensemble 110 via one or more other networks, for example, a Bluetooth network, a WiFi network, and/or any other network, e.g., in conjunction with HBC network 105.

In some demonstrative embodiments, memory 194 may store a plurality of device identifiers 129 of a plurality of wearable devices belonging to wearable device ensemble 110.

In one example, memory 194 may store a first device identifier 121 of device 120, a second device 131 identifier of device 130, a third device identifier 141 of device 140, and a fourth device identifier 151 of device 150, for example, if devices 120, 130, 140 and 150 belong to wearable device ensemble 110.

In some demonstrative embodiments, the plurality of device identifiers 129 may include a plurality of unique identifiers to uniquely identify each wearable device of the plurality of device identifiers 129.

In one example, one or more of device identifiers 129 may be globally unique. For example, a wearable device of ensemble 110 may have a device identifier, which may be different from any other device identifier of any other device, e.g., even if the other device does not belong to ensemble 110.

In another example, one or more of device identifiers 129 may be locally unique, e.g., each wearable device of wearable device ensemble 110 may have a unique device identifier, e.g., with respect to other devices of ensemble 110, for example, while the device identifier of the wearable device of ensemble 110 may be the same as a device identifier of another device not belonging to wearable device ensemble 110. For example, device 160 may include a device identifier 161. According to this example, device identifiers 121, 131, 141, 151 and/or 161 may be different one from another.

In another example, a wearable device may have two identifiers, e.g., a global device identifier and a local device identifier. According to this example, ensemble manager 125 may ignore the global device identifier and may use the local device identifier, for example, when identifying the wearable device and/or communicating with the wearable device over HBC network 105.

In some demonstrative embodiments, device identifiers 121, 131, 141, 151 and/or 161 may be implemented as part of devices 120, 130, 140, 150 and/or 160.

In other embodiments, one or more device identifiers of device identifiers 121, 131, 141, 151 and/or 161 may be implemented as a separate element of a wearable device.

The one or more device identifiers may be attached to the wearable device, e.g., by a glue, a magnetic force, a band, and the like, for example, to enable the wearable device to be part of wearable device ensemble 110.

In one example, wearable device 140 may include a scarf, and device identifier 141 may include an ID tag having a unique identifier. According to this example, the ID tag may be attached to the scarf, for example, to enable ensemble manager 125 to define the scarf as part of wearable device ensemble 110, and/or to detect the presence and/or the absence of the scarf on the body.

In some demonstrative embodiments, ensemble manager 125 may define device identifiers 129 based on an input from the user.

In some demonstrative embodiments, device 120 may include a user interface 124 configured to receive the input from the user.

In one example, the user may define device identifiers 129 by manually typing device identifiers 129 on user interface 124.

In other embodiments, user interface 124 may not be part of device 120. For example, user interface 124 may be part of computing device 180.

In some demonstrative embodiments, ensemble manager 125 may define device identifiers 129 based on any other method.

In one example, ensemble manager 125 may associate device identifiers 129 with wearable device ensemble 110, for example, when the user puts on each device of wearable device ensemble 110, e.g., when ensemble manager 125 is already worn by the user.

In some demonstrative embodiments, HBC transceiver 114 may receive one or more detected identifiers 127 of one or more detected wearable devices on the body of the user over HBC network 105 via the body of the user.

In one example, HBC transceiver 114 may receive device identifiers 131 and 141 over HBC network 105 via the body of the user, for example, if devices 130 and 140 are detected on the body of the user.

In another example, HBC transceiver 114 may receive device identifiers 131 and 151 over HBC network 105 via the body of the user, e.g., while not receiving device identifier 141, for example, if devices 130 and 150 are detected on the body of the user, and device 140 is not on the body of the user.

In some demonstrative embodiments, device 120 may store detected identifiers 127 in memory 194, for example, to keep track and/or to monitor detected identifiers 127.

In some demonstrative embodiments, ensemble manager 125 may generate an alert 126 based on a comparison between detected identifiers 127 and the plurality of device identifiers 129.

In some demonstrative embodiments, alert 126 may be configured to notify the user of wearable device ensemble 110.

In some demonstrative embodiments, alert 126 may include, for example, a text message, a sound, a light indication, a vibration, and/or any other indication configured to notify the user.

In some demonstrative embodiments, ensemble manager 125 may cause output 193 to output alert 126 to the user.

In some demonstrative embodiments, ensemble manager 125 may cause HBC transceiver 114 to transmit alert 126 to another wearable device of wearable device ensemble 110 via HBC network 105.

In one example, wearable device ensemble 110 may include the fitness ensemble, wearable device 120 may include a Smartphone, and wearable device 140 may include headphones. According to this example, HBC transceiver 114 may transmit alert 126 to the earphones, for example, to enable the user to hear alert 126 via the headphones.

In some demonstrative embodiments, ensemble manager 125 may generate alert 126 to indicate that wearable device ensemble 110 is complete, for example, if all of the device identifiers 129 are included in detected identifiers 127.

In one example, wearable device ensemble 110 may include devices 120, 130, 140 and 150. According to this example, device identifiers 129 may include device identifiers 121, 131, 141 and 151. Ensemble manager 125 may generate alert 126 to indicate that wearable device ensemble 110 is complete, for example, if all of device identifiers 121, 131, 141 and 151 are included in detected identifiers 127.

In some demonstrative embodiments, ensemble manager 125 may generate alert 126 to indicate that one or more wearable devices of wearable device ensemble 110 are missing, for example, if at least one device identifier of device identifiers 129 is not included in detected identifier 127.

In one example, wearable device ensemble 110 may include devices 120, 130, 140 and 150. According to this example, device identifiers 129 may include device identifiers 121, 131, 141 and 145. Ensemble manager 125 may generate alert 126 to indicate that one or more wearable devices of wearable device ensemble 110 are missing, for example, if only device identifiers 121, 131 and 141 are included in detected identifiers 127, e.g., and device identifier 151 is missing.

In some demonstrative embodiments, ensemble manager 125 may generate alert 126 to indicate that an other wearable device, which does not belong to wearable device ensemble 110, is on the body of the user, for example, if a detected identifier of detected identifiers 127 does not match any device identifier of device identifiers 129.

In one example, wearable device ensemble 110 may include devices 120, 130, 140 and 150. According to this example, device identifiers 129 may include device identifiers 121, 131, 141 and 151. Ensemble manager 125 may generate alert 126 to indicate that an other wearable device, which does not belong to wearable device ensemble 110, is on the body of the user, for example, if device identifiers 121, 131, 141 and device identifier 161 of wearable device 160 are included in detected identifiers 127, e.g., since device identifier 161 belongs to device 160, which does not belong to wearable device ensemble 110.

In some demonstrative embodiments, ensemble manager 125 may update the plurality of device identifiers 129, based on the one or more detected identifiers 127.

In one example, wearable device ensemble 110 may include devices 120, 130, 140 and 150. According to this example, device identifiers 129 may include device identifiers 121, 131, 141 and 151. Ensemble manager 125 may update the plurality of device identifiers 129 to include device identifiers 121, 131, 141, 151 and 161, for example, if detected identifiers 127 include device identifier 161 of wearable device 160, and the user would like to add wearable device 160 to wearable device ensemble 110.

In another example, wearable device ensemble 110 may include devices 120, 130, 140 and 150. According to this example, device identifiers 129 may include device identifiers 121, 131, 141 and 151. Ensemble manager 125 may update the plurality of device identifiers 129 to include device identifiers 121, 131, 141, for example, if detected identifiers 127 do no include device identifier 151, and the user would like to remove wearable device 150 from wearable device ensemble 110.

In some demonstrative embodiments, ensemble manager 125 may generate alert 126 to indicate any other scenarios and/or cases with respect to wearable device ensemble 110.

In one example, ensemble manager 125 may generate alert 126 to indicate, for example, a usage of a wearable device of wearable device ensemble 110. For example, ensemble manager 125 may generate alert 126 to indicate wearable device 140, e.g., a shirt, is being worn twice within a short time period, e.g., day after day.

In another example, ensemble manager 125 may generate alert 126 to indicate, for example, a mismatch and/or a misfit of a wearable device to wearable device ensemble 110. For example, ensemble manager 125 may generate alert 126 to a blind user to indicate that a color of wearable device 140, e.g., a shirt, does not match the color of other wearable devices, e.g., a suit and a tie, of wearable device ensemble 110.

In another example, ensemble manager 125 may generate alert 126, for example, based on any other scenario, criteria, algorithm and the like.

In some demonstrative embodiments, a wearable device of devices 130, 140, 150 and/or 160 may be configured to send a respective device identifier of device identifiers 131, 141, 151 and/or 161. For example, wearable device 140 may be configured to send device identifier 141. In some demonstrative embodiments, the wearable device may be configured to store the device identifier. For example, device 140 may include a memory 145 to store device identifier 141.

In some demonstrative embodiments, controller 144 may control HBC transceiver 144 to transmit device identifier 141.

In some demonstrative embodiments, controller 142 may control HBC transceiver 144 to transmit a presence message (also referred to as "device present" message) including device identifier 141, for example, upon coupling the coupling electrodes 147 to the body of the user, e.g. as described below.

In one example, HBC transceiver 144 may send the presence message, for example, when wearable device 140 touches the skin of the user, or when wearable device 140 is in close proximity to the body of the user, e.g. as described below.

In some demonstrative embodiments, HBC transceiver 144 may periodically send the presence message, for example, when coupling electrodes 147 are coupled to the body of the user.

In some demonstrative embodiments, the wearable device may send the device identifier, for example, based on a request from another device, e.g., as described below.

In some demonstrative embodiments, wearable device 140 may send device identifier 141, for example, in response to a presence request from ensemble manager 125, e.g., as described below.

In one example, ensemble manager 125 may send the presence request, for example, to determine the presence and/or the absence of the wearable device on the body of the user.

In some demonstrative embodiments, ensemble manger 125 may cause HBC transceiver 114 to transmit the presence request via HBC network 105.

In some demonstrative embodiments, the presence request may include a device identifier of an other wearable device of wearable device ensemble 110. For example, the presence request may include device identifier 141 of wearable device 140.

In some demonstrative embodiments, the other wearable device may receive the presence request, for example, if the other device is on the body of the user. The other wearable device may transmit a presence response massage including the device identifier of the other wearable device, e.g., in response to the presence request. For example, HBC transceiver 144 may receive the presence request, for example, if device 140 is on the body of the user, and controller 142 may control HBC Transceiver 144 to transmit to device 120 a presence response message including device identifier 141, e.g., in response to the presence request.

In some demonstrative embodiments, HBC transceiver 114 may receive from the other wearable device the presence response message, e.g., in response to the presence request, for example, if the other wearable device is on the body.

In some demonstrative embodiments, the presence response message may include the device identifier of the other wearable device.

In one example, ensemble manager 125 may monitor the presence of device 140. According to this example, HBC transceiver 114 may transmit the presence request via HBC network 105 including device identifier 141. HBC transceiver 144 may receive the presence request, and may send the presence response message including device identifier 141. HBC transceiver 114 may receive the presence response message including device identifier 141 via HBC network 105, for example, if wearable device 140 is worn by the user and receives the presence request.

Some demonstrative embodiments may enable to select a wearable device ("managing device") to manage wearable device ensemble 110.

In some demonstrative embodiments, the wearable devices of wearable device ensemble 110 may be configured to select the managing device to manage wearable device ensemble 110.

In one example, the wearable devices of wearable device ensemble 110 may be configured to select another wearable device of wearable device ensemble 110, e.g., a wearable device different from wearable device 120, to manage wearable device ensemble 110.

In some demonstrative embodiments, a managing device, e.g., wearable device 120, may be configured to transfer the management of wearable device ensemble 110 to at least one other wearable device of wearable device ensemble 110, e.g., wearable device 130.

In some demonstrative embodiments, HBC transceiver 114 may be configured to transmit the detected identifiers 127 to the at least one other wearable device of wearable device ensemble 110, for example, to enable the other wearable device to manage wearable device ensemble 110.

In some demonstrative embodiments, the other wearable device may be configured to receive the management of wearable device ensemble 110 from the managing device.

In some demonstrative embodiments, the other wearable device may be configured to receive one or more messages, e.g., the presence request and/or the presence response message, for example, to enable the other wireless device to keep track of the detected wireless devices on the body, and/or to receive the management of wearable device ensemble 110.

In some demonstrative embodiments, a wearable device of wearable device ensemble 110 may include a manager capability attribute to indicate one or more capabilities of the wearable device to become the managing device. For example, wearable device 120 may include manager capability attribute 123, and/or device 130 may include manager capability attribute 133.

In one example, the manager capability attribute of a wearable device may indicate whether or not the wearable device has one or more resources, e.g., hardware resources and/or software resources, to enable the wearable device to become the managing device.

In some demonstrative embodiments, the one or more resources may include a user interface, e.g., a touch screen, a keyboard, and the like; an output, e.g., a speaker, a screen, and the like; a processor, and/or any other resources to manage wearable device ensemble 110.

In some demonstrative embodiments, the manager capability attribute may be represented by a number or a grade, for example, to enable a comparison between different manager capability attributes, e.g., manager capability attributes 133 and 123.

In one example, a first wearable device of wearable device ensemble 110 may have improved and/or increased resources to manage ensemble 110, e.g., compared to a second wearable device of wearable device ensemble 110, for example, if a grade of the manager capability attribute of the first device is greater than a grade of the manager capability attribute of the second device.

In some demonstrative embodiments, the managing device may determine whether or not to transfer the management of wearable device ensemble 110 to another device, for example, based on the manager capability attribute of the managing device, e.g., as describe below.

In some demonstrative embodiments, HBC transceiver 114 may receive from another wearable device of wearable device ensemble 110 a proposal message including a proposal to manage wearable device ensemble 110.

In some demonstrative embodiments, the proposal massage may include manager capability information to indicate a manager capability attribute of the other wearable device.

For example, HBC transceiver 114 may receive from wearable device 130 the proposal message including manager capability attribute 133.

In some demonstrative embodiments, HBC transceiver 114 may transmit a response message to the other wearable device to indicate whether or not the proposal is accepted. For example, HBC transceiver 114 may transmit the response message to wearable device 130, e.g., in response to the proposal message.

In some demonstrative embodiments, ensemble manager 125 may determine whether or not to accept the proposal, for example, based on a comparison between manager capability attributes 133 and 123.

In one example, ensemble manager 125 may accept the proposal, for example, if manager capability attribute 123 has a higher grade than the grade of manager capability attribute 133.

In another example, ensemble manager 125 may not accept the proposal, for example, if manager capability attribute 123 has a lower grade than the grade of manager capability attribute 133.

In some demonstrative embodiments, the response message may include detected identifiers 127, for example, if the proposal is accepted.

In some demonstrative embodiments, the response may include the device identifier of the manager, e.g., device identifier 121, for example, if the proposal is not accepted, for example, to indicate that wearable device 120 is to manage wearable device ensemble 110.

In some demonstrative embodiments, wearable device 130 may become the managing device, for example, if wearable device 130 does not receive a response to the proposal message.

In one example, wearable device 130 may not receive the response to the proposal message, for example, if wearable device 120 is not present on the body of the user and/or wearable device 130 is the only wearable device of wearable ensemble device 110 having the manager capability, which is on the body of the user.

Figure 2:
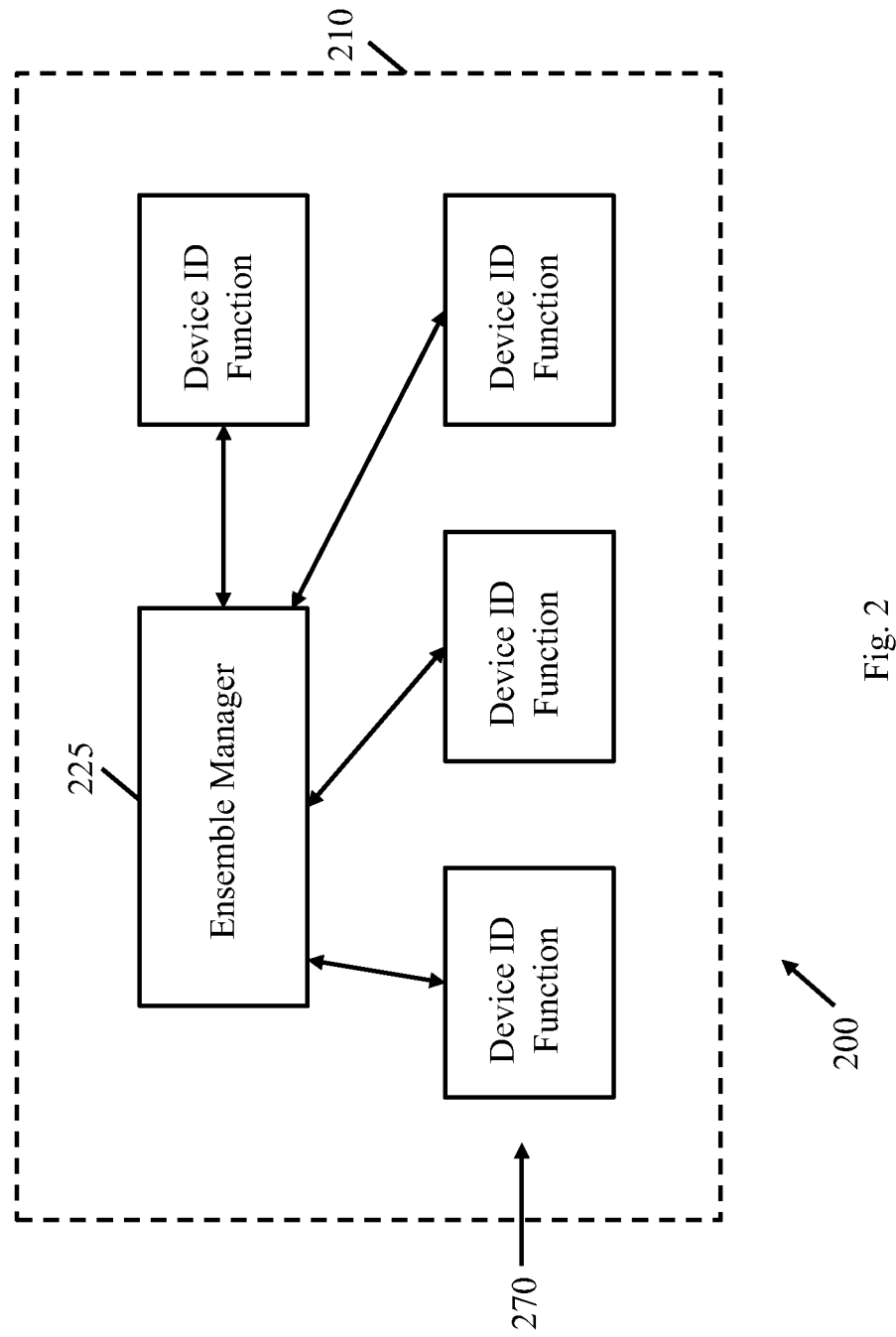
FIG. 2 is a schematic illustration of a communication scheme between an ensemble manager of a wearable device ensemble and one more wearable devices of the wearable device ensemble, in accordance with some demonstrative embodiments.

Reference is made to FIG. 2, which schematically illustrates a communication scheme between an ensemble manager 225 of a wearable device ensemble 210 and one or more wearable devices 270 of the wearable device ensemble 210, in accordance with some demonstrative embodiments. For example, ensemble manager 225 may perform the functionality of ensemble manager 125 (FIG. 1), and/or the one more wearable devices 270 may perform the functionality of wearable devices 130, 140, and/or 150 (FIG. 1).

As shown in FIG. 2, ensemble manager 225 may communicate with wearable devices 170 to manage wearable device ensemble 210.

In one example, ensemble manager 225 may communicate with wearable devices 270 presence requests and/or presence response messages, for example, to indicate the presence and/or the absence of one or more wearable devices of wearable devices 270, e.g., as described above.

In some demonstrative embodiments, wearable devices 270 may include a device ID functionality configured to generate and/or send to ensemble manger 225 one or more messages including the device identities of wearable devices 270, e.g., as described above.

In some demonstrative embodiments, a controller of wearable devices 270 may be configured to perform the device ID functionality.

In one example, controller 142 (FIG. 1) may be configured to send to ensemble manager 125 (FIG. 1) the presence message including device identifier 141 (FIG. 1), for example, when device 140 (FIG. 1) is coupled to the body, and/or the presence response message including device identifier 141 (FIG. 1), e.g., in response to the presence request from ensemble manager 125 (FIG. 1), e.g., as described above.

Figure 3:
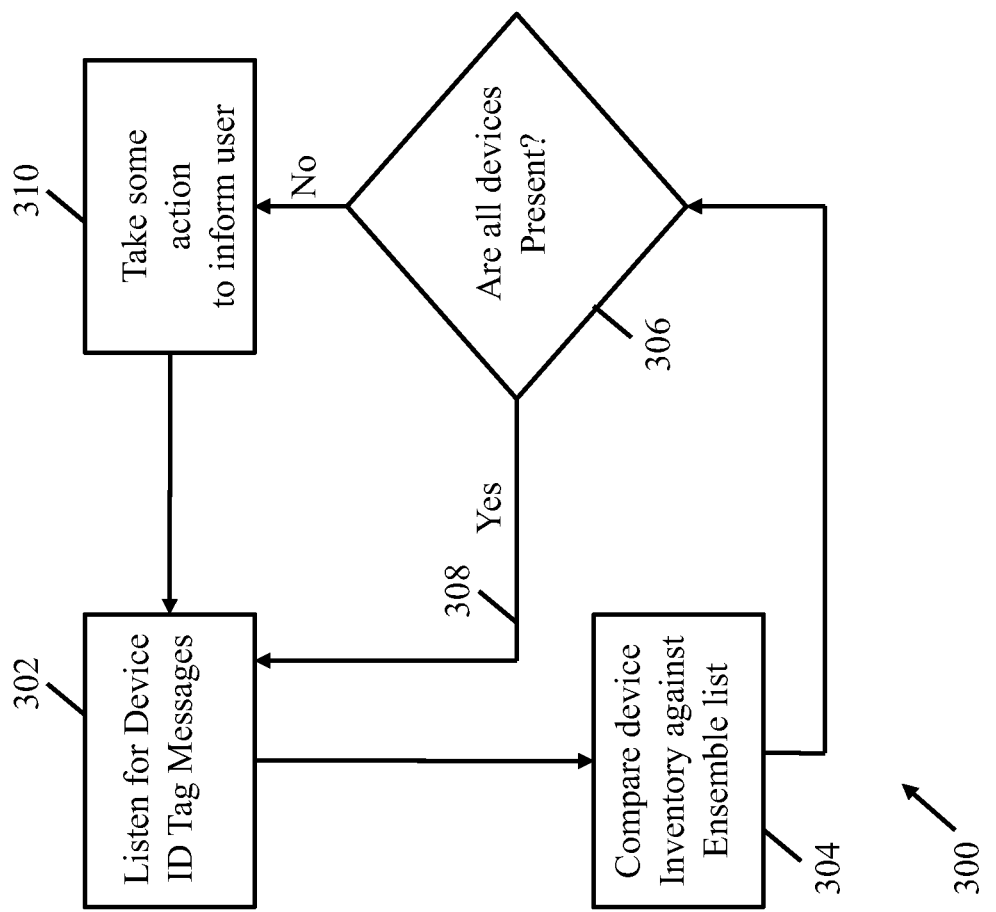
FIG. 3 is a schematic flow chart illustration of a method of determining a presence of one or more wearable devices on a body of a user, in accordance with some demonstrative embodiments.

Reference is made to FIG. 3, which schematically illustrates a method of determining the presence of one or more wearable devices on a body of a user, in accordance with some demonstrative embodiments. For example, one or more of the operations of the method of FIG. 3 may be performed by one or more elements of a system, e.g., system 100 (FIG. 1); a wearable device, e.g., wearable devices 120, 130, 140, 150, and/or 160 (FIG. 1); an HBC transceiver, e.g., HBC transceiver 114 (FIG. 1) and/or HBC transceiver 134 (FIG. 1), and/or an ensemble manager, e.g., ensemble manager 125 (FIG. 1) and/or ensemble manager 135 (FIG. 1).

As indicated at block 302, the method may include receiving via an HBC network one or more detected identifiers of one or more detected wearable devices on a body of the user. For example, ensemble manager 125 (FIG. 1) may receive detected identifiers 127 (FIG. 1) from one or more of devices 120, 130, 140 and/or 150, e.g., as described above.

As indicated at block 304, the method may include comparing between the detected identifiers to a plurality of devices identifiers of a plurality of wearable devices belonging to a wearable device ensemble. For example, ensemble manager 125 (FIG. 1) may compare between detected identifiers 127 (FIG. 1) and the plurality of device identifiers 129 (FIG. 1) of ensemble 110 (FIG. 1), e.g., as described above.

As indicated at block 306, the method may include determining whether or not all of wearable devices of the ensemble are present on the body of the user. For example, ensemble manager 125 (FIG. 1) may determine whether or not all of the devices of ensemble 110 are present on the body of the user, e.g., as described above.

As indicated by arrow 308, the method may include continuing to monitor reception of the detected identifiers of the devices of the ensemble, for example, if all of the wearable devices of the ensemble are detected to be present on the body of the user. For example, ensemble manager 125 (FIG. 1) may continue to monitor reception of the identifiers of the devices of ensemble 110 (FIG. 1), for example, if all of the wearable devices of ensemble 110 (FIG. 1) are detected to be present on the body of the user, e.g., as described above.

As indicated at block 310, the method may include generating an alert to indicate to the user that one or more wearable devices of the wearable device ensemble are missing, for example, if at least one device of the wearable ensemble is not detected. For example, ensemble manager 125 (FIG. 1) may generate alert 126 (FIG. 1) to indicate that one or more wearable devices of wearable device ensemble 110 (FIG. 1) are missing, e.g., as described above.

Figure 4:
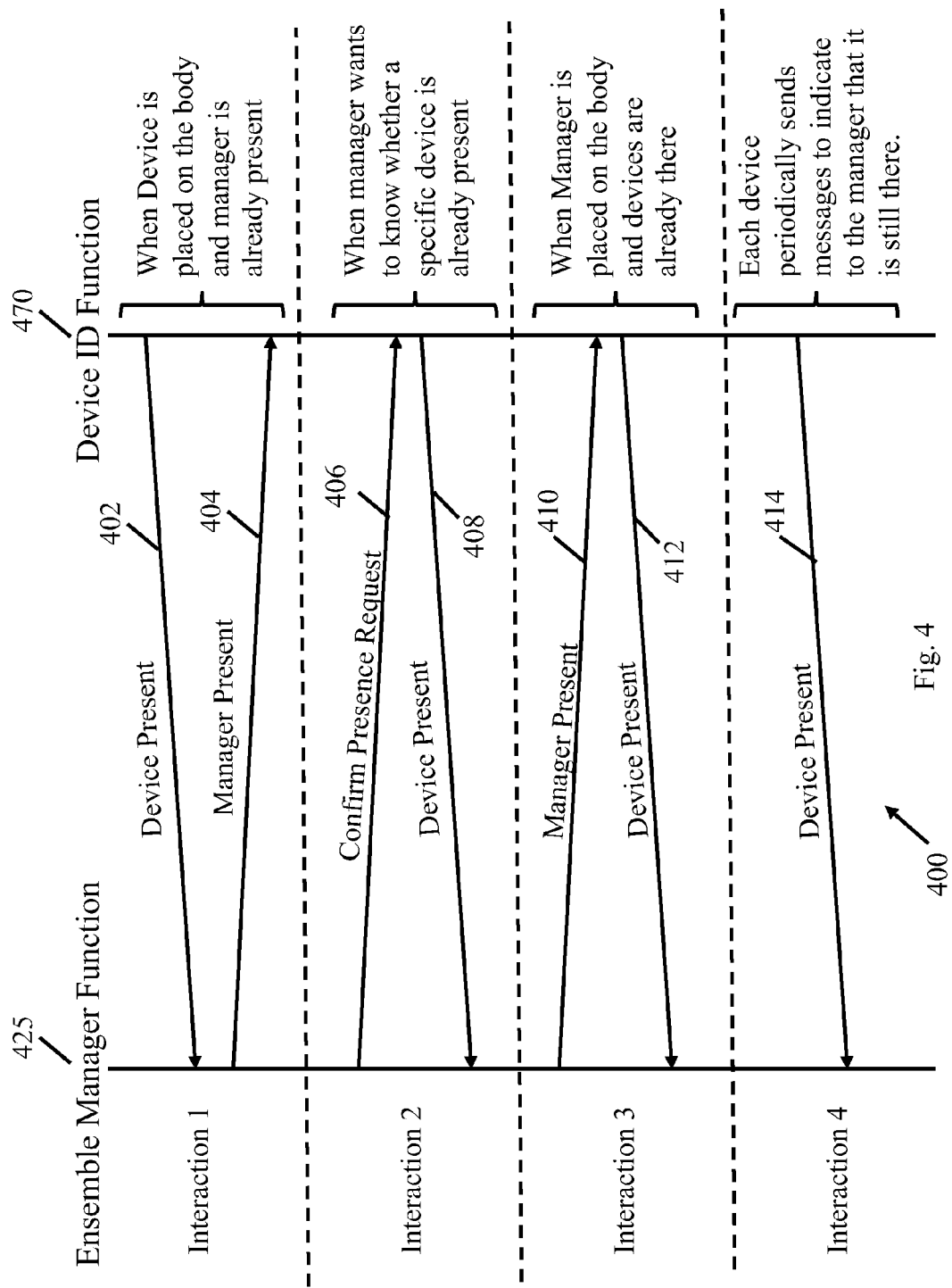
FIG. 4 is a schematic illustration of a sequence diagram describing operations and interactions between an ensemble manager and one or more wearable devices, in accordance with some demonstrative embodiments.

Reference is made to FIG. 4, which schematically illustrates a sequence diagram of a protocol 400 of operations and interactions between an ensemble manager 425 of a wearable device ensemble and a wearable device 470, in accordance with some demonstrative embodiments. For example, ensemble manager 425 may perform the functionality of ensemble manager 125 (FIG. 1), and/or wearable device 470 may perform the functionality of wearable device 130, wearable device 140, and/or wearable device 150 (FIG. 1).

As shown in FIG. 4, protocol 400 may include four interactions, denoted "Interaction 1"—"Interaction 4", between ensemble manager 425 and wearable device 470.

As shown in FIG. 4, Interaction 1 may include an interaction between ensemble manager 425 and wearable device 470, for example, when wearable device 470 is placed on a body of a user, and ensemble manager 425 is already present on the body of the user, e.g., as described below.

As shown in FIG. 4, during Interaction 1, wearable device 470 may transmit a device present message 402 to ensemble manager 425, for example, to notify that wearable device 470 is placed on the body of the user. For example, wearable device 130 and/or wearable device 140 (FIG. 1) may transmit device present message 402 to ensemble manager 125 (FIG. 1), for example, when device 130 and/or wearable device 140 (FIG. 1) is placed on the body of the user.

In some demonstrative embodiments, device present message 402 may include a device ID of wearable device 470. For example, wearable device 130 (FIG. 1) may transmit device present message 402 including device ID 131 (FIG. 1), and/or device 140 (FIG. 1) may transmit device present message 402 including device ID 141 (FIG. 1).

As also shown in FIG. 4, during Interaction 1, ensemble manager 425 may send a manager present massage 404 to wearable device 470, for example, in response to device present message 402, for example, to notify that ensemble manager 425 is present on the body.

In some demonstrative embodiments, manager present message 404 may include a device ID of ensemble manager 425. For example, ensemble manager 125 (FIG. 1) may send manager present message 404 including device ID 121 (FIG. 1).

As shown in FIG. 4, Interaction 2 may include an interaction between ensemble manager 425 and wearable device 470, for example, when the ensemble manager 425 determines whether or not wearable device 470 is present on the body of the user, e.g., as described below.

As shown in FIG. 4, during Interaction 2, ensemble manager 425 may send a presence request message 406 to wearable device 470, for example, in order to determine whether or not wearable device 470 is present on the body of the user.

In some demonstrative embodiments, presence request 406 may include the device ID of wearable device 470. For example, ensemble manager 125 (FIG. 1) may send to wearable device 130 (FIG. 1) the device presence request 406 including device ID 131 (FIG. 1), for example, to determine whether or not wearable device 130 (FIG. 1) is present on the body of the user.

As also shown in FIG. 4, during Interaction 2, wearable device 470 may send a device present message 408 to ensemble manager 425, for example, in response to device present message 406.

In some demonstrative embodiments, device present message 408 may include the device ID of wearable device 470. For example, wearable device 130 (FIG. 1) may send device present message 408 including device ID 131 (FIG. 1) to ensemble manager 125 (FIG. 1), for example, in response to device present message 406.

As shown in FIG. 4, Interaction 3 may include an interaction between ensemble manager 425 and wearable device 470, for example, when ensemble manager 425 is placed on the body of the user, and wearable device 470 is already present on the body of the user, e.g., as described below.

As shown in FIG. 4, during Interaction 3, ensemble manager 425 may send a manager present message 410 to wearable device 470, for example, to notify that ensemble manager 425 is placed on the body of the user.

In some demonstrative embodiments, manager present message 410 may include the device ID of ensemble manager 425. For example, ensemble manager 125 (FIG. 1) may send to wearable device 130, wearable device 140, and/or wearable device 150 (FIG. 1) the device present message 410 including device ID 121 (FIG. 1), for example, when ensemble manager 125 (FIG. 1) is placed on the body of the user.

As shown in FIG. 4, during Interaction 3, wearable device 470 may transmit a device present message 412 to ensemble manager 425, for example, in response to manager present message 410.

In some demonstrative embodiments, device present message 412 may include the device ID of wearable device 470. For example, wearable device 130 (FIG. 1) may transmit device present message 412 including device ID 131 (FIG. 1) to ensemble manager 125 (FIG. 1), for example, in response to manager present message 410.

As shown in FIG. 4, Interaction 4 may include an interaction between ensemble manager 425 and wearable device 470, for example, when wearable device 470 periodically notifies ensemble manager 425 that wearable device 470 is present on the body of the user.

As shown in FIG. 4, during Interaction 4, wearable device 470 may transmit a device present message 414 to ensemble manager 425, for example, in order to notify that wearable device 470 is present on the body of the user.

In some demonstrative embodiments, device present message 414 may include the device ID of wearable device 470. For example, wearable device 130 (FIG. 1) may periodically send device present message 414 including device ID 131 (FIG. 1), for example, to notify ensemble manager 125 (FIG. 1) that wearable device 130 (FIG. 1) is present on the body of the user.

Figure 5:
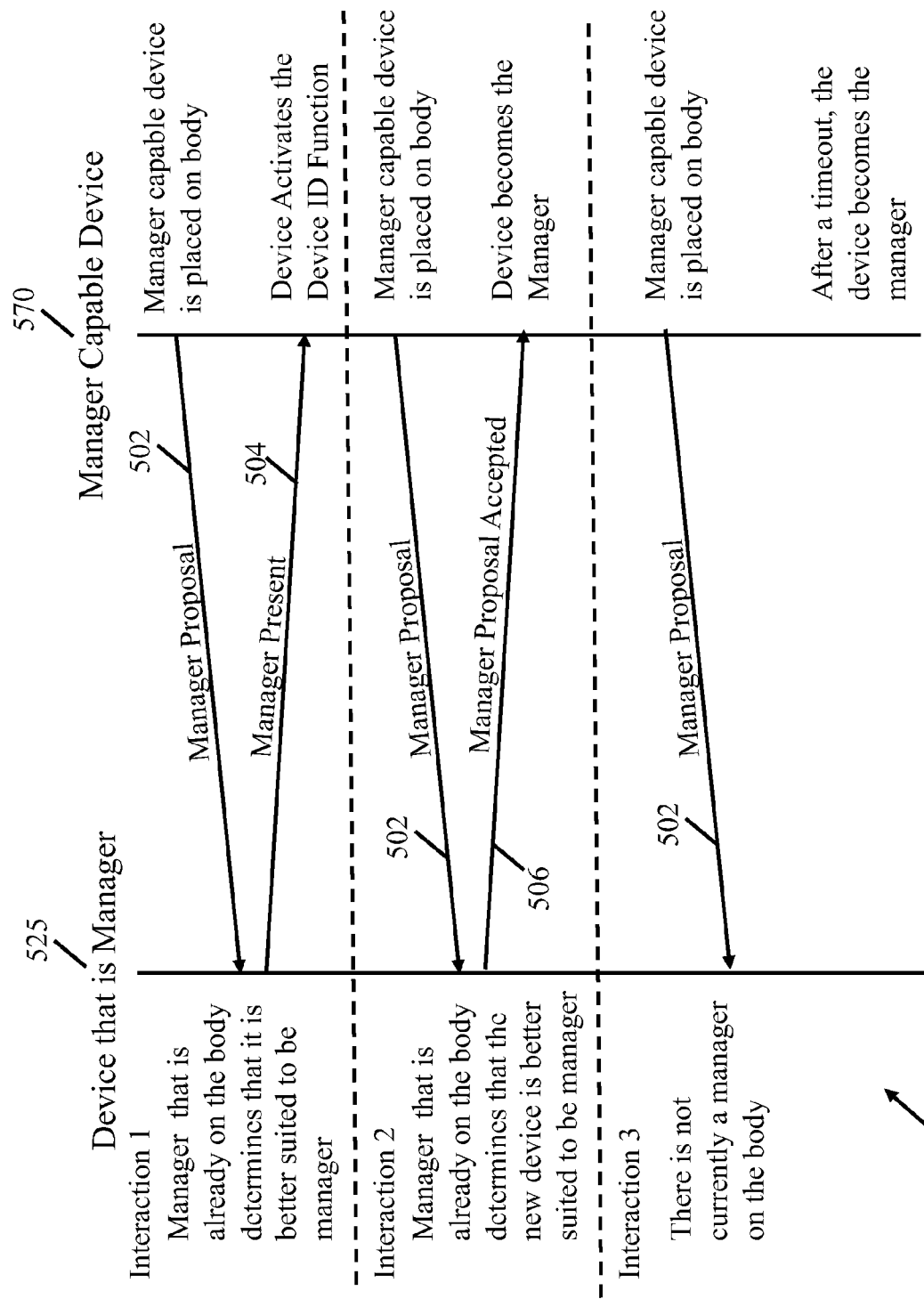
FIG. 5 is a schematic illustration of a sequence diagram describing operations and interactions for selecting an ensemble manager, in accordance with some demonstrative embodiments.

Reference is made to FIG. 5, which schematically illustrates a sequence diagram of a protocol 500 of operations and interactions for selecting an ensemble manager, for example, when two or more devices are capable of being the ensemble manager, in accordance with some demonstrative embodiments.

As shown in FIG. 5, protocol 500 may include three interactions, denoted "Interaction 1"—"Interaction 3", between an ensemble manager 525 of a wearable device ensemble and a wearable device 570 of the wearable device ensemble. For example, ensemble manager 525 may perform the functionality of ensemble manager 125 (FIG. 1), and/or wearable device 570 may perform the functionality of wearable device 130, wearable device 140, and/or wearable device 150 (FIG. 1).

As shown in FIG. 5, Interaction 1 may include an interaction between ensemble manager 525 and wearable device 570, for example, when wearable device 570 is placed on a body of a user, and ensemble manager 525 selects to remain the managing device of the wearable device ensemble manager, e.g., as described below.

As shown in FIG. 5, during Interaction 1, wearable device 570 may transmit a proposal message 502 to ensemble manager 525, for example, when wearable device 570 is placed on the body of the user. For example, wearable device 130 (FIG. 1) may transmit proposal message 502 to ensemble manager 125 (FIG. 1), for example, when device 130 (FIG. 1) is placed on the body of the user.

In some demonstrative embodiments, proposal message 502 may include a device ID of wearable device 570, and/or a managing capability attribute of device 570. For example, wearable device 130 (FIG. 1) may transmit proposal message 502 including device ID 131 (FIG. 1), and/or managing capability attribute 133 (FIG. 1) to wearable device 120 (FIG. 1), e.g., as described above.

As shown in FIG. 5, during Interaction 1, ensemble manager 525 may determine that ensemble manager 525 is to remain the ensemble manager, and ensemble manager 525 may send a manager present message 504 to wearable device 570, for example, in response to proposal message 502.

In some demonstrative embodiments, ensemble manager 525 may send manager present message 504 to wearable device 570 to indicate that the proposal is not accepted.

In some demonstrative embodiments, manager present message 504 may include a device ID of ensemble manager 525, for example to notify that ensemble manager 525 is to remain the managing device of the wearable device ensemble. For example, ensemble manager 125 (FIG. 1) may send manager present message 504 including ID 121 (FIG. 1) to wearable device 130 (FIG. 1).

As shown in FIG. 5, Interaction 2 may include an interaction between ensemble manager 525 and wearable device 570, for example, when wearable device 570 is placed on the body of the user, and ensemble manager 525 is the managing device of the wearable device ensemble, e.g., as described below.

As shown in FIG. 5, during Interaction 2, wearable device 570 may transmit proposal message 502 to ensemble manager 525, for example, when wearable device 570 is placed on the body of the user.

As shown in FIG. 5, during Interaction 2, ensemble manager 525 may determine that wearable device 570 is to become the managing device of the wearable device ensemble.

As shown in FIG. 5, during Interaction 2, ensemble manager 525 may send a response message 506 to wearable device 570, for example, in response to proposal message 502. For example, ensemble manager (FIG. 1) may send response message 506 to wearable device 130 (FIG. 1).

In some demonstrative embodiments, ensemble manager 525 may send response message 506 to wearable device 570 to indicate that the proposal is accepted.

In some demonstrative embodiments, response message 506 may include device IDs of wearable devices present on the body of the user. For example, ensemble manager 125 (FIG. 1) may send response message 506 including device IDs 129 (FIG. 1).

As shown in FIG. 5, Interaction 3 may include an interaction between ensemble manager 525 and wearable device 570, for example, when wearable device 570 is placed on the body of the user, and ensemble manager 525 is absent, e.g., as described below.

As shown in FIG. 5, during Interaction 3, wearable device 570 may transmit proposal message 502 to ensemble manager 525, for example, when wearable device 570 is placed on the body of the user. For example, wearable device 130 (FIG. 1) may transmit proposal message 502 to ensemble manager 125 (FIG. 1).

As shown in FIG. 5, during Interaction 3, ensemble manager 525 may not be present on the body of the user. For example, ensemble manager 125 (FIG. 1) may not be present on the body of the user.

As shown in FIG. 5, during Interaction 3, wearable device 570 may become the current ensemble manager, for example, if wearable device 570 does not receive a response to proposal message 502, for example, within a predefined time period. For example, wearable device 130 (FIG. 1) may become the managing device, for example, if wearable device 130 (FIG. 1) does not receive the response to proposal message 502.

Figure 6:
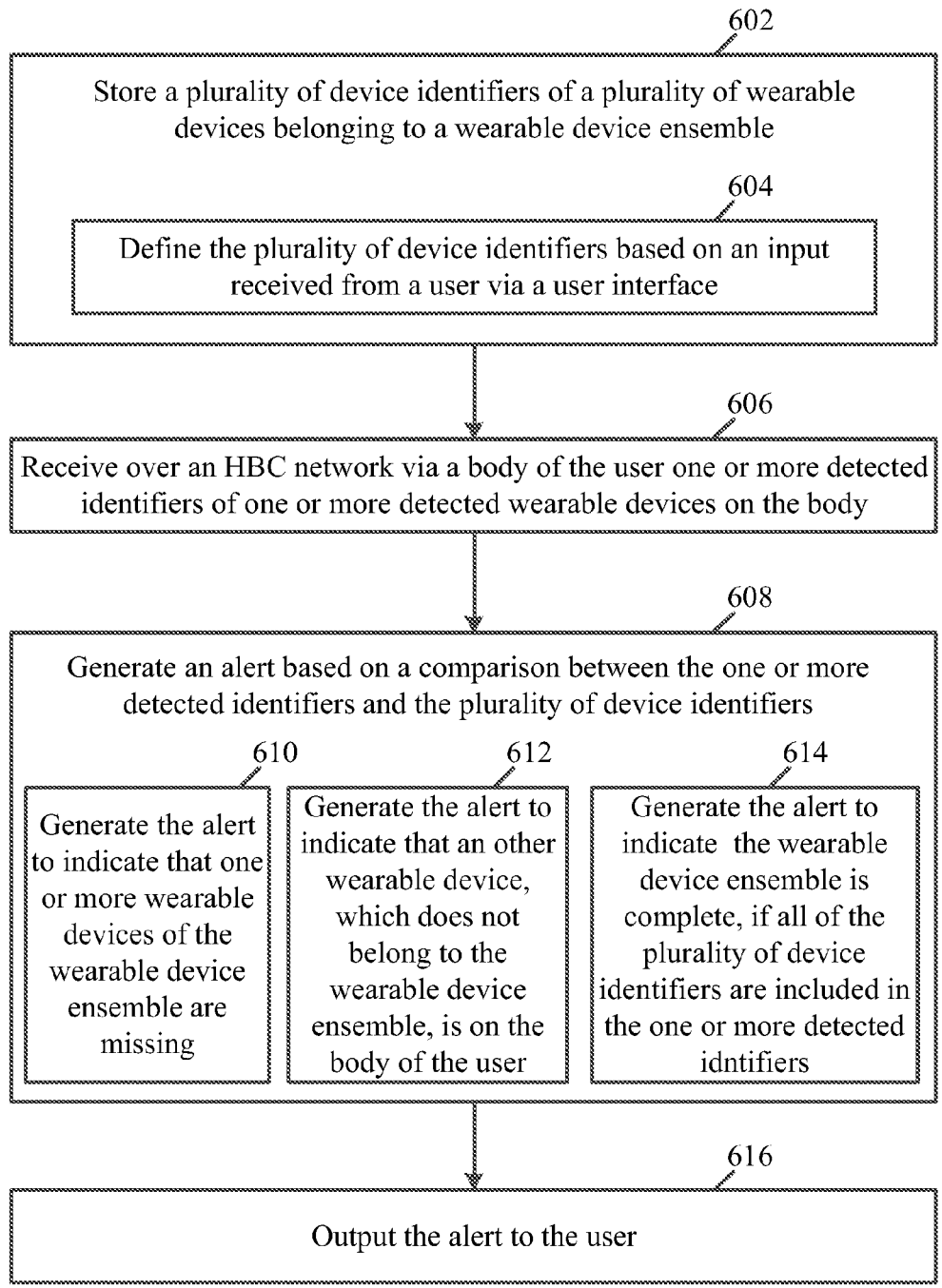
FIG. 6 is a schematic flow-chart illustration of a method of managing a wearable device ensemble, in accordance with some demonstrative embodiments.

Reference is made to FIG. 6, which schematically illustrates a method of managing a wearable device ensemble, in accordance with some demonstrative embodiments. In some demonstrative embodiments, one or more of the operations of the method of FIG. 6 may be performed by one or more elements of a system, e.g., system 100 (FIG. 1), a wearable device, e.g., wearable devices 120, 130, 140, 150, and/or 160 (FIG. 1); an HBC transceiver, e.g., HBC transceiver 114 (FIG. 1) and/or HBC transceiver 134 (FIG. 1); and/or an ensemble manager, e.g., ensemble manager 125 (FIG. 1) and/or ensemble manager 135 (FIG. 1).

As indicated at block 602, the method may include storing a plurality of device identifiers of a plurality of wearable devices belonging to a wearable device ensemble. For example, ensemble manager 125 (FIG. 1) may store in memory 194 (FIG. 1) device identifiers 129 (FIG. 1) of one or more wearable devices belonging to wearable device ensemble 110 (FIG. 1), e.g., as described above.

As indicated at block 604, storing the plurality of device identifiers may include defining the plurality of device identifiers based on an input received from a user via a user interface. For example, ensemble manager 125 (FIG. 1) may define device identifiers 129 (FIG. 1) based on the input from the user via user interface 124 (FIG. 1), e.g., as described above.

As indicated at block 606, the method may include receiving over an HBC network via a body of the user one or more detected identifiers of one or more detected wearable devices on the body. For example, receiver 118 (FIG. 1) may receive over HBC network 105 (FIG. 1) via the body of the user the detected identifiers 127 (FIG. 1) of one or more detected wearable devices on the body, e.g., as described above.

As indicated at block 608, the method may include generating an alert based on a comparison between the one or more detected identifiers and the plurality of device identifiers of the ensemble. For example, ensemble manager 125 (FIG. 1) may generate alert 126 (FIG. 1) based on the comparison between detected identifiers 127 (FIG. 1) and device identifiers 129 (FIG. 1), e.g., as described above.

As indicated at block 610, generating the alert may include generating the alert to indicate that one or more wearable devices of the wearable device ensemble are missing. For example, ensemble manager 125 (FIG. 1) may generate alert 126 (FIG. 1) to indicate that one or more wearable devices of wearable device ensemble 110 (FIG. 1) are missing, e.g., as described above.

As indicated at block 612, generating the alert may include generating the alert to indicate that another wearable device, which does not belong to the wearable device ensemble, is on the body of the user. For example, ensemble manager 125 (FIG. 1) may generate alert 126 (FIG. 1) to indicate that wearable device 160 (FIG. 1), which does not belong to wearable device ensemble 110 (FIG. 1), is on the body of the user, e.g., as described above.

As indicated at block 614, generating the alert may include generating the alert to indicate that the wearable device ensemble is complete, e.g., if all of the device identifiers of the ensemble are included in the one or more detected identifiers. For example, ensemble manager 125 (FIG. 1) may generate alert 126 (FIG. 1) to indicate that wearable device ensemble 110 is complete (FIG. 1), for example, if all of the device identifiers 129 (FIG. 1) of ensemble 110 (FIG. 1) are included in the detected identifiers 127 (FIG. 1), e.g., as described above.

As indicated at block 616, the method may include outputting the alert to the user. For example, ensemble manager 125 (FIG. 1) may cause output 193 (FIG. 1) to output alert 126 (FIG. 1) to the user, e.g., as described above.

Figure 7:
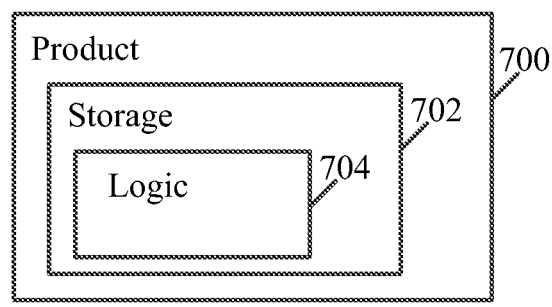
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include one or more tangible computer-readable non-transitory storage media 702 to store logic 704, which may be used, for example, to control and/or to perform at least part of the functionality of devices 120, 130, 140, 150, and/or 160 (FIG. 1), ensemble manager 125 (FIG. 1), ensemble manager 135 (FIG. 1), HBC transceiver 114 (FIG. 1), HBC transceiver 134 (FIG. 1), user interface 124 (FIG. 1), to perform one or more of the operations of the sequences of FIGS. 4 and/or 5, and/or to perform one or more operations of the methods of FIGS. 3 and/or 6. The phrase "non-transitory machine-readable medium" is directed to include all computer-readable media, with the sole exception being a transitory propagating signal.

In some demonstrative embodiments, product 700 and/or media 702 may include one or more types of computer-readable storage media capable of storing data, including volatile memory, non-volatile memory, removable or non-removable memory, erasable or non-erasable memory, writeable or re-writeable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a wearable device comprising a memory to store a plurality of device identifiers of a plurality of wearable devices belonging to a wearable device ensemble; a human body communication (HBC) transceiver to communicate over an HBC network via a body of a user, the HBC transceiver to receive via the HBC network one or more detected identifiers of one or more detected wearable devices on the body; and an ensemble manager to manage the wearable device ensemble, and to generate an alert based on a comparison between the one or more detected identifiers and the plurality of device identifiers.

Example 2 includes the subject matter of Example 1, and optionally, comprising a user interface, wherein the ensemble manager is to define the plurality of device identifiers based on an input received from the user via the user interface.

Example 3 includes the subject matter of Example 1 or 2, and optionally, wherein the plurality of device identifiers includes a plurality of unique identifiers to uniquely identify each wearable device of the plurality of wearable devices.

Example 4 includes the subject matter of any one of Examples 1-3, and optionally, comprising an output, the ensemble manager is to cause the output to output the alert to the user.

Example 5 includes the subject matter of any one of Examples 1-4, and optionally, wherein the ensemble manager is to generate the alert to indicate the wearable device ensemble is complete, if all of the plurality of device identifiers are included in the one or more detected identifiers.

Example 6 includes the subject matter of any one of Examples 1-5, and optionally, wherein the ensemble manager is to generate the alert to indicate that one or more wearable devices of the wearable device ensemble are missing, if at least one device identifier of the plurality of device identifiers is not included in the one or more detected identifiers.

Example 7 includes the subject matter of any one of Examples 1-6, and optionally, wherein the ensemble manager is to generate the alert to indicate that an other wearable device, which does not belong to the wearable device ensemble, is on the body of the user, if a detected identifier of the one or more detected identifiers does not match any device identifier of the plurality of device identifiers.

Example 8 includes the subject matter of any one of Examples 1-7, and optionally, wherein the ensemble manager is to cause the HBC transceiver to transmit a presence request via the HBC network, the presence request including a device identifier of another wearable device of the wearable device ensemble, the ensemble manager is to receive from the another wearable device, in response to the presence request, a response message including the device identifier, if the another wearable device is on the body.

Example 9 includes the subject matter of any one of Examples 1-8, and optionally, wherein the ensemble manager is to update the plurality of device identifiers based on the one or more detected identifiers.

Example 10 includes the subject matter of any one of Examples 1-9, and optionally, wherein the HBC transceiver is to transmit the alert to another wearable device of the wearable device ensemble via the HBC network.

Example 11 includes the subject matter of any one of Examples 1-10, and optionally, wherein the HBC transceiver is to transmit the one or more detected identifiers to at least one wearable device of the wearable device ensemble.

Example 12 includes the subject matter of any one of Examples 1-11, and optionally, wherein the HBC transceiver is to receive from another wearable device of the wearable device ensemble a proposal message including a proposal to manage the wearable device ensemble, the message including manager capability information to indicate a manager capability of the another wearable device, the HBC transceiver is to transmit a response message to the another wearable device to indicate whether or not the proposal is accepted.

Example 13 includes the subject matter of Example 12, and optionally, wherein the response includes the one or more detected identifiers, if the proposal is accepted.

Example 14 includes the subject matter of Example 12, and optionally, wherein the response includes a device identifier of the wearable device to indicate the wearable device is to manage the wearable device ensemble, if the proposal is not accepted.

Example 15 includes the subject matter of any one of Examples 1-14, and optionally, comprising one or more coupling electrodes; and a processor.

Example 16 includes a system comprising a wearable device, the wearable device comprising one or more coupling electrodes; a processor; a memory to store a plurality of device identifiers of a plurality of wearable devices belonging to a wearable device ensemble; a human body communication (HBC) transceiver to communicate over an HBC network via a body of a user, the HBC transceiver to receive via the HBC network one or more detected identifiers of one or more detected wearable devices on the body; and an ensemble manager to manage the wearable device ensemble, and to generate an alert based on a comparison between the one or more detected identifiers and the plurality of device identifiers.

Example 17 includes the subject matter of Example 16, and optionally, comprising a user interface, wherein the ensemble manager is to define the plurality of device identifiers based on an input received from the user via the user interface.

Example 18 includes the subject matter of Example 16 or 17, and optionally, wherein the plurality of device identifiers includes a plurality of unique identifiers to uniquely identify each wearable device of the plurality of wearable devices.

Example 19 includes the subject matter of any one of Examples 16-18, and optionally, comprising an output, the ensemble manager is to cause the output to output the alert to the user.

Example 20 includes the subject matter of any of Examples 16-19, and optionally, wherein the ensemble manager is to generate the alert to indicate the wearable device ensemble is complete, if all of the plurality of device identifiers are included in the one or more detected identifiers.

Example 21 includes the subject matter of any one of Examples 16-20, and optionally, wherein the ensemble manager is to generate the alert to indicate that one or more wearable devices of the wearable device ensemble are missing, if at least one device identifier of the plurality of device identifiers is not included in the one or more detected identifiers.

Example 22 includes the subject matter of any one of Examples 16-21, and optionally, wherein the ensemble manager is to generate the alert to indicate that an other wearable device, which does not belong to the wearable device ensemble, is on the body of the user, if a detected identifier of the one or more detected identifiers does not match any device identifier of the plurality of device identifiers.

Example 23 includes the subject matter of any one of Examples 16-22, and optionally, wherein the ensemble manager is to cause the HBC transceiver to transmit a presence request via the HBC network, the presence request including a device identifier of another wearable device of the wearable device ensemble, the ensemble manager is to receive from the another wearable device, in response to the presence request, a response message including the device identifier, if the another wearable device is on the body.

Example 24 includes the subject matter of any one of Examples 16-23, and optionally, wherein the ensemble manager is to update the plurality of device identifiers based on the one or more detected identifiers.

Example 25 includes the subject matter of any one of Examples 16-24, and optionally, wherein the HBC transceiver is to transmit the alert to another wearable device of the wearable device ensemble via the HBC network.

Example 26 includes the subject matter of any one of Examples 16-25, and optionally, wherein the HBC transceiver is to transmit the one or more detected identifiers to at least one wearable device of the wearable device ensemble.

Example 27 includes the subject matter of any one of Examples 16-26, and optionally, wherein the HBC transceiver is to receive from another wearable device of the wearable device ensemble a proposal message including a proposal to manage the wearable device ensemble, the message including manager capability information to indicate a manager capability of the another wearable device, the HBC transceiver is to transmit a response message to the another wearable device to indicate whether or not the proposal is accepted.

Example 28 includes the subject matter of Example 27, and optionally, wherein the response includes the one or more detected identifiers, if the proposal is accepted.

Example 29 includes the subject matter of Example 27, and optionally, wherein the response includes a device identifier of the wearable device to indicate the wearable device is to manage the wearable device ensemble, if the proposal is not accepted.

Example 30 includes a method to be performed at a wearable device, the method comprising storing a plurality of device identifiers of a plurality of wearable devices belonging to a wearable device ensemble; receiving over a human body communication (HBC) network via a body of a user one or more detected identifiers of one or more detected wearable devices on the body; and generating an alert based on a comparison between the one or more detected identifiers and the plurality of device identifiers.

Example 31 includes the subject matter of Example 30, and optionally, comprising defining the plurality of device identifiers based on an input received from the user via a user interface.

Example 32 includes the subject matter of Example 30 or 31, and optionally, wherein the plurality of device identifiers includes a plurality of unique identifiers to uniquely identify each wearable device of the plurality of wearable devices.

Example 33 includes the subject matter of any one of Examples 30-32, and optionally, comprising outputting the alert to the user.

Example 34 includes the subject matter of any one of Examples 30-33, and optionally, comprising generating the alert to indicate the wearable device ensemble is complete, if all of the plurality of device identifiers are included in the one or more detected identifiers.

Example 35 includes the subject matter of any one of Examples 30-34, and optionally, comprising generating the alert to indicate that one or more wearable devices of the wearable device ensemble are missing, if at least one device identifier of the plurality of device identifiers is not included in the one or more detected identifiers.

Example 36 includes the subject matter of any one of Examples 30-35, and optionally, comprising generating the alert to indicate that an other wearable device, which does not belong to the wearable device ensemble, is on the body of the user, if a detected identifier of the one or more detected identifiers does not match any device identifier of the plurality of device identifiers.

Example 37 includes the subject matter of any one of Examples 30-36, and optionally, comprising transmitting a presence request via the HBC network, the presence request including a device identifier of another wearable device of the wearable device ensemble, and receiving from the another wearable device, in response to the presence request, a response message including the device identifier, if the another wearable device is on the body.

Example 38 includes the subject matter of any one of Examples 30-37, and optionally, comprising updating the plurality of device identifiers based on the one or more detected identifiers.

Example 39 includes the subject matter of any one of Examples 30-38, and optionally, comprising transmitting the alert to another wearable device of the wearable device ensemble via the HBC network.

Example 40 includes the subject matter of any one of Examples 30-39, and optionally, comprising transmitting the one or more detected identifiers to at least one wearable device of the wearable device ensemble.

Example 41 includes the subject matter of any one of Examples 30-40, and optionally, comprising receiving from another wearable device of the wearable device ensemble a proposal message including a proposal to manage the wearable device ensemble, the message including manager capability information to indicate a manager capability of the another wearable device, and transmitting a response message to the another wearable device to indicate whether or not the proposal is accepted.

Example 42 includes the subject matter of Example 41, and optionally, wherein the response includes the one or more detected identifiers, if the proposal is accepted.

Example 43 includes the subject matter of Example 41, and optionally, wherein the response includes a device identifier of the wearable device to indicate the wearable device is to manage the wearable device ensemble, if the proposal is not accepted.

Example 44 includes a product including one or more tangible computer-readable non-transitory storage media comprising computer-executable instructions operable to, when executed by at least one computer processor, enable the at least one computer processor to implement a method at a wearable device, the method comprising storing a plurality of device identifiers of a plurality of wearable devices belonging to a wearable device ensemble; receiving over a human body communication (HBC) network via a body of a user one or more detected identifiers of one or more detected wearable devices on the body; and generating an alert based on a comparison between the one or more detected identifiers and the plurality of device identifiers.

Example 45 includes the subject matter of Example 44, and optionally, wherein the method comprises defining the plurality of device identifiers based on an input received from the user via the user interface.

Example 46 includes the subject matter of Example 44 or 45, and optionally, wherein the plurality of device identifiers includes a plurality of unique identifiers to uniquely identify each wearable device of the plurality of wearable devices.

Example 47 includes the subject matter of any one of Examples 44-46, and optionally, wherein the method comprises outputting the alert to the user.

Example 48 includes the subject matter of any one of Examples 44-47, and optionally, wherein the method comprises generating the alert to indicate the wearable device ensemble is complete, if all of the plurality of device identifiers are included in the one or more detected identifiers.

Example 49 includes the subject matter of any one of Examples 44-48, and optionally, wherein the method comprises generating the alert to indicate that one or more wearable devices of the wearable device ensemble are missing, if at least one device identifier of the plurality of device identifiers is not included in the one or more detected identifiers.

Example 50 includes the subject matter of any one of Examples 44-49, and optionally, wherein the method comprises generating the alert to indicate that an other wearable device, which does not belong to the wearable device ensemble, is on the body of the user, if a detected identifier of the one or more detected identifiers does not match any device identifier of the plurality of device identifiers.

Example 51 includes the subject matter of any one of Examples 44-50, and optionally, wherein the method comprises transmitting a presence request via the HBC network, the presence request including a device identifier of another wearable device of the wearable device ensemble, and receiving from the another wearable device, in response to the presence request, a response message including the device identifier, if the another wearable device is on the body.

Example 52 includes the subject matter of any one of Examples 44-51, and optionally, wherein the method comprises updating the plurality of device identifiers based on the one or more detected identifiers.

Example 53 includes the subject matter of any one of Examples 44-52, and optionally, wherein the method comprises transmitting the alert to another wearable device of the wearable device ensemble via the HBC network.

Example 54 includes the subject matter of any one of Examples 44-53, and optionally, wherein the method comprises transmitting the one or more detected identifiers to at least one wearable device of the wearable device ensemble.

Example 55 includes the subject matter of any one of Examples 44-54, and optionally, wherein the method comprises receiving from another wearable device of the wearable device ensemble a proposal message including a proposal to manage the wearable device ensemble, the message including manager capability information to indicate a manager capability of the another wearable device, and transmitting a response message to the another wearable device to indicate whether or not the proposal is accepted.

Example 56 includes the subject matter of Example 55, and optionally, wherein the response includes the one or more detected identifiers, if the proposal is accepted.

Example 57 includes the subject matter of Example 55, and optionally, wherein the response includes a device identifier of the wearable device to indicate the wearable device is to manage the wearable device ensemble, if the proposal is not accepted.

Example 58 includes an apparatus comprising means for storing at a wearable device a plurality of device identifiers of a plurality of wearable devices belonging to a wearable device ensemble; means for receiving over a human body communication (HBC) network via a body of a user one or more detected identifiers of one or more detected wearable devices on the body; and means for generating an alert based on a comparison between the one or more detected identifiers and the plurality of device identifiers.

Example 59 includes the subject matter of Example 58, and optionally, comprising means for defining the plurality of device identifiers based on an input received from the user via a user interface.

Example 60 includes the subject matter of Example 58 or 59, and optionally, wherein the plurality of device identifiers includes a plurality of unique identifiers to uniquely identify each wearable device of the plurality of wearable devices.

Example 61 includes the subject matter of any one of Examples 58-60, and optionally, comprising means for outputting the alert to the user.

Example 62 includes the subject matter of any one of Examples 58-61, and optionally, comprising means for generating the alert to indicate the wearable device ensemble is complete, if all of the plurality of device identifiers are included in the one or more detected identifiers.

Example 63 includes the subject matter of any one of Examples 58-62, and optionally, comprising means for generating the alert to indicate that one or more wearable devices of the wearable device ensemble are missing, if at least one device identifier of the plurality of device identifiers is not included in the one or more detected identifiers.

Example 64 includes the subject matter of any one of Examples 58-63, and optionally, comprising means for generating the alert to indicate that an other wearable device, which does not belong to the wearable device ensemble, is on the body of the user, if a detected identifier of the one or more detected identifiers does not match any device identifier of the plurality of device identifiers.

Example 65 includes the subject matter of any one of Examples 58-64, and optionally, comprising means for transmitting a presence request via the HBC network, the presence request including a device identifier of another wearable device of the wearable device ensemble, and means for receiving from the another wearable device, in response to the presence request, a response message including the device identifier, if the another wearable device is on the body.

Example 66 includes the subject matter of any one of Examples 58-65, and optionally, comprising means for updating the plurality of device identifiers based on the one or more detected identifiers.

Example 67 includes the subject matter of any one of Examples 58-66, and optionally, comprising means for transmitting the alert to another wearable device of the wearable device ensemble via the HBC network.

Example 68 includes the subject matter of any one of Examples 58-67, and optionally, comprising means for transmitting the one or more detected identifiers to at least one wearable device of the wearable device ensemble.

Example 69 includes the subject matter of any one of Examples 58-68, and optionally, comprising means for receiving from another wearable device of the wearable device ensemble a proposal message including a proposal to manage the wearable device ensemble, the message including manager capability information to indicate a manager capability of the another wearable device, and means for transmitting a response message to the another wearable device to indicate whether or not the proposal is accepted.

Example 70 includes the subject matter of Example 69, and optionally, wherein the response includes the one or more detected identifiers, if the proposal is accepted.

Example 71 includes the subject matter of Example 69, and optionally, wherein the response includes a device identifier of the wearable device to indicate the wearable device is to manage the wearable device ensemble, if the proposal is not accepted.

Example 72 includes a wearable device comprising one or more coupling electrodes; and a human body communication (HBC) transceiver to transmit a presence message over an HBC network via a body of a user, upon coupling the one or more coupling electrodes to the body, the presence message including a device identifier to identify the wearable device.

Example 73 includes the subject matter of Example 72, and optionally, wherein the device identifier includes a unique identifier to uniquely identify the wearable device from other wearable devices of a wearable device ensemble.

Example 74 includes the subject matter of Example 72 or 73, and optionally, wherein the HBC transceiver is to periodically transmit the presence message via the body, when the one or more coupling electrodes are coupled to the body of the user.

Example 75 includes the subject matter of any one of Examples 72-74, and optionally, wherein the HBC transceiver is to receive via the HBC network a presence request including the device identifier, and, in response to the presence request, to transmit a presence response message including the device identifier.

Example 76 includes the subject matter of any one of Examples 72-75, and optionally, comprising a memory to store the device identifier.

Example 77 includes a system including a wearable device, the wearable device comprising one or more coupling electrodes; a memory to store a device identifier to identify the wearable device; and a human body communication (HBC) transceiver to transmit a presence message over an HBC network via a body of a user, upon coupling the one or more coupling electrodes to the body, the presence message including the device identifier.

Example 78 includes the subject matter of Example 77, and optionally, wherein the device identifier includes a unique identifier to uniquely identify the wearable device from other wearable devices of a wearable device ensemble.

Example 79 includes the subject matter of Example 77 or 78, and optionally, wherein the HBC transceiver is to periodically transmit the presence message via the body, when the one or more coupling electrodes are coupled to the body of the user.

Example 80 includes the subject matter of any one of Examples 77-79, and optionally, wherein the HBC transceiver is to receive via the HBC network a presence request including the device identifier, and, in response to the presence request, to transmit a presence response message including the device identifier.

Example 81 includes a method to be performed at a wearable device, the method comprising storing a device identifier to identify the wearable device; and upon coupling one or more coupling electrodes of the wearable device to a body of a user, transmitting over a human body communication (HBC) network via the body of the user a presence message including the device identifier.

Example 82 includes the subject matter of Example 81, and optionally, wherein the device identifier includes a unique identifier to uniquely identify the wearable device from other wearable devices of a wearable device ensemble.

Example 83 includes the subject matter of Example 81 or 82, and optionally, comprising periodically transmitting the presence message via the body, when the one or more coupling electrodes are coupled to the body of the user.

Example 84 includes the subject matter of any one of Examples 81-83, and optionally, comprising receiving via the HBC network a presence request including the device identifier, and, in response to the presence request, transmitting a presence response message including the device identifier.

Example 85 includes a product including one or more tangible computer-readable non-transitory storage media comprising computer-executable instructions operable to, when executed by at least one computer processor, enable the at least one computer processor to implement a method at a wearable device, the method comprising storing a device identifier to identify the wearable device; and upon coupling one or more coupling electrodes of the wearable device to a body of a user, transmitting over a human body communication (HBC) network via the body of the user a presence message including the device identifier.

Example 86 includes the subject matter of Example 85, and optionally, wherein the device identifier includes a unique identifier to uniquely identify the wearable device from other wearable devices of a wearable device ensemble.

Example 87 includes the subject matter of Example 85 or 86, and optionally, wherein the method comprises periodically transmitting the presence message via the body, when the one or more coupling electrodes are coupled to the body of the user.

Example 88 includes the subject matter of any one of Examples 85-87, and optionally, wherein the method comprises receiving via the HBC network a presence request including the device identifier, and, in response to the presence request, transmitting a presence response message including the device identifier.

Example 89 includes an apparatus comprising means for storing a device identifier to identify a wearable device; and means for, upon coupling one or more coupling electrodes of the wearable device to a body of a user, transmitting over a human body communication (HBC) network via the body of the user a presence message including the device identifier.

Example 90 includes the subject matter of Example 89, and optionally, wherein the device identifier includes a unique identifier to uniquely identify the wearable device from other wearable devices of a wearable device ensemble.

Example 91 includes the subject matter of Example 89 or 90, and optionally, comprising means for periodically transmitting the presence message via the body, when the one or more coupling electrodes are coupled to the body of the user.

Example 92 includes the subject matter of any one of Examples 89-91, and optionally, comprising means for receiving via the HBC network a presence request including the device identifier, and means for, in response to the presence request, transmitting a presence response message including the device identifier.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:
1. A wearable device comprising:
   a memory to store a plurality of device identifiers of a plurality of wearable devices belonging to a wearable device ensemble;
   a human body communication (HBC) transceiver to communicate over an HBC network via a body of a user, said HBC transceiver to receive via said HBC network one or more detected identifiers of one or more detected wearable devices on said body; and an ensemble manager to manage said wearable device ensemble, and to generate an alert based on a comparison between said one or more detected identifiers and said plurality of device identifiers.

2. The wearable device of claim 1 comprising a user interface, wherein said ensemble manager is to define said plurality of device identifiers based on an input received from said user via said user interface.

3. The wearable device of claim 1, wherein said plurality of device identifiers includes a plurality of unique identifiers to uniquely identify each wearable device of said plurality of wearable devices.

4. The wearable device of claim 1 comprising an output, said ensemble manager is to cause said output to output said alert to said user.

5. The wearable device of claim 1, wherein said ensemble manager is to generate said alert to indicate said wearable device ensemble is complete, if all of said plurality of device identifiers are included in said one or more detected identifiers.

6. The wearable device of claim 1, wherein said ensemble manager is to generate said alert to indicate that one or more wearable devices of said wearable device ensemble are missing, if at least one device identifier of said plurality of device identifiers is not included in said one or more detected identifiers.

7. The wearable device of claim 1, wherein said ensemble manager is to generate said alert to indicate that an other wearable device, which does not belong to said wearable device ensemble, is on said body of said user, if a detected identifier of said one or more detected identifiers does not match any device identifier of said plurality of device identifiers.

8. The wearable device of claim 1, wherein said ensemble manager is to cause said HBC transceiver to transmit a presence request via said HBC network, said presence request including a device identifier of another wearable device of said wearable device ensemble, said ensemble manager is to receive from said another wearable device, in response to said presence request, a response message including said device identifier, if said another wearable device is on said body.

9. The wearable device of claim 1, wherein said ensemble manager is to update said plurality of device identifiers based on said one or more detected identifiers.

10. The wearable device of claim 1, wherein said HBC transceiver is to transmit said alert to another wearable device of said wearable device ensemble via said HBC network.

11. The wearable device of claim 1, wherein said HBC transceiver is to transmit said one or more detected identifiers to at least one wearable device of said wearable device ensemble.

12. The wearable device of claim 1, wherein said HBC transceiver is to receive from another wearable device of said wearable device ensemble a proposal message including a proposal to manage said wearable device ensemble, said message including manager capability information to indicate a manager capability of said another wearable device, said HBC transceiver is to transmit a response message to said another wearable device to indicate whether or not said proposal is accepted.

13. The wearable device of claim 12, wherein said response includes said one or more detected identifiers, if said proposal is accepted.

14. The wearable device of claim 12, wherein said response includes a device identifier of said wearable device to indicate said wearable device is to manage said wearable device ensemble, if said proposal is not accepted.

15. A wearable device comprising:
one or more coupling electrodes; and
a human body communication (HBC) transceiver to transmit a presence message over an HBC network via a body of a user, upon coupling said one or more coupling electrodes to the body, said presence message including a device identifier to identify said wearable device.

16. The wearable device of claim 15, wherein said device identifier includes a unique identifier to uniquely identify said wearable device from other wearable devices of a wearable device ensemble.

17. The wearable device of claim 15, wherein said HBC transceiver is to periodically transmit said presence message via said body, when said one or more coupling electrodes are coupled to the body of the user.

18. The wearable device of claim 15, wherein said HBC transceiver is to receive via said HBC network a presence request including said device identifier, and, in response to said presence request, to transmit a presence response message including said device identifier.

19. The wearable device of claim 15 comprising a memory to store said device identifier.

20. A method to be performed at a wearable device, the method comprising:
storing a plurality of device identifiers of a plurality of wearable devices belonging to a wearable device ensemble;
receiving over a human body communication (HBC) network via a body of a user one or more detected identifiers of one or more detected wearable devices on said body; and
generating an alert based on a comparison between said one or more detected identifiers and said plurality of device identifiers.

21. The method of claim 20 comprising generating said alert to indicate that one or more wearable devices of said wearable device ensemble are missing, if at least one device identifier of said plurality of device identifiers is not included in said one or more detected identifiers.

22. A product including one or more tangible computer-readable non-transitory storage media comprising computer-executable instructions operable to, when executed by at least one computer processor, enable the at least one computer processor to implement a method at a wearable device, the method comprising:
storing a plurality of device identifiers of a plurality of wearable devices belonging to a wearable device ensemble;
receiving over a human body communication (HBC) network via a body of a user one or more detected identifiers of one or more detected wearable devices on said body; and
generating an alert based on a comparison between said one or more detected identifiers and said plurality of device identifiers.

23. The product of claim 22, wherein said method comprises defining said plurality of device identifiers based on an input received from said user via said user interface.

24. The product of claim 22, wherein said method comprises transmitting a presence request via said HBC network, said presence request including a device identifier of another wearable device of said wearable device ensemble, and receiving from said another wearable device, in response to said presence request, a response message including said device identifier, if said another wearable device is on said body.

25. The product of claim 22, wherein said method comprises receiving from another wearable device of said wearable device ensemble a proposal message including a proposal to manage said wearable device ensemble, said message including manager capability information to indicate a manager capability of said another wearable device, and transmitting a response message to said another wearable device to indicate whether or not said proposal is accepted.

\* \* \* \* \*